Sept. 12, 1967  D. J. ABERLE  3,341,647
METHOD AND APPARATUS FOR MAKING DUAL-LIP SEALS
Filed Oct. 14, 1963
2 Sheets-Sheet 1
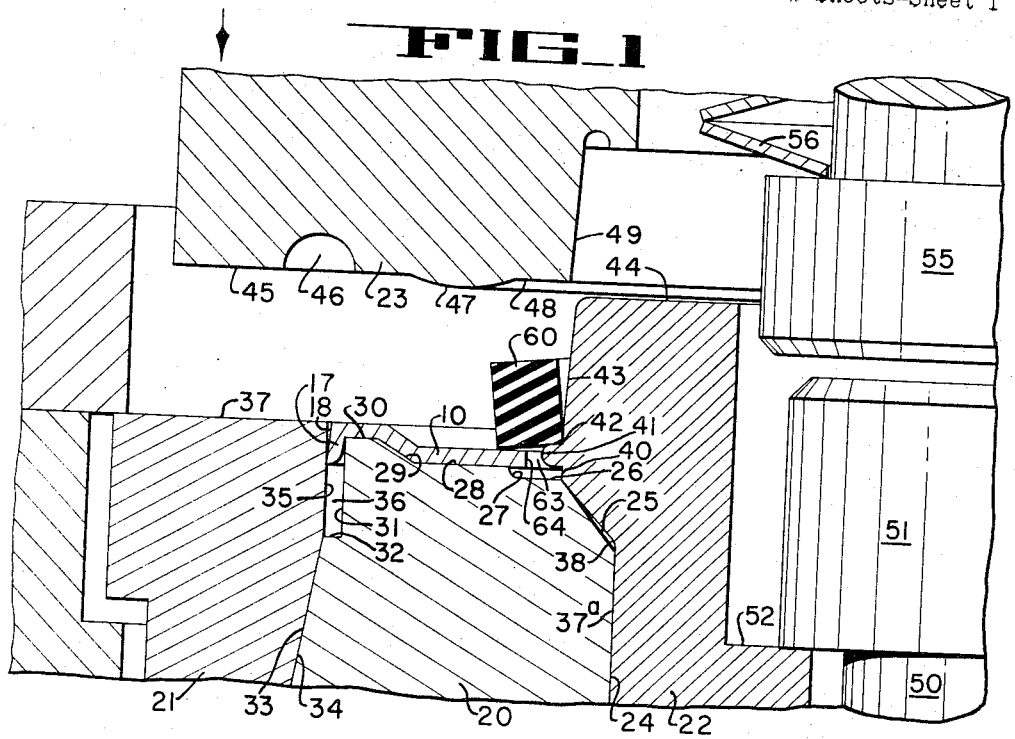
FIG_1
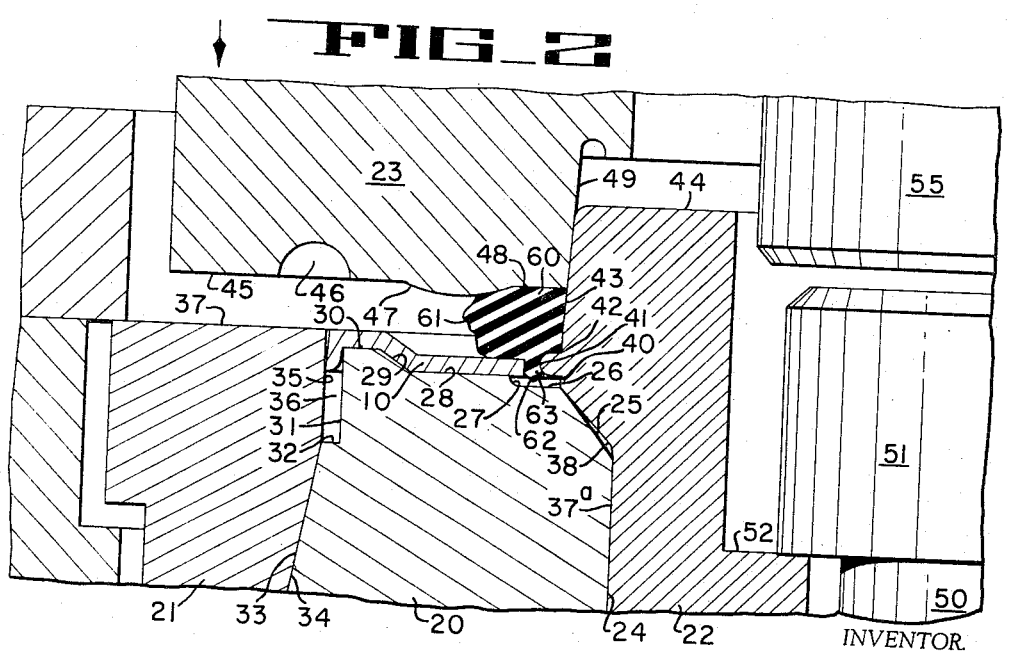
FIG_2
INVENTOR.
DOUGLAS J. ABERLE
BY *A. Donham Owen &*
*Robert S. Wickersham*
ATTORNEYS Sept. 12, 1967  D. J. ABERLE  3,341,647
METHOD AND APPARATUS FOR MAKING DUAL-LIP SEALS
Filed Oct. 14, 1963  2 Sheets-Sheet 2
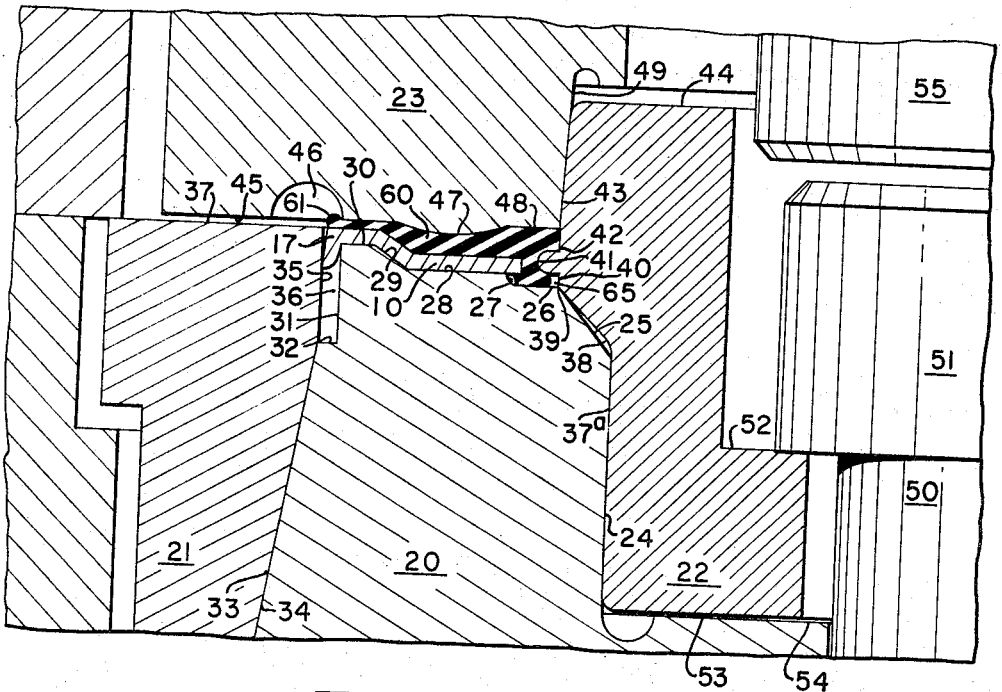
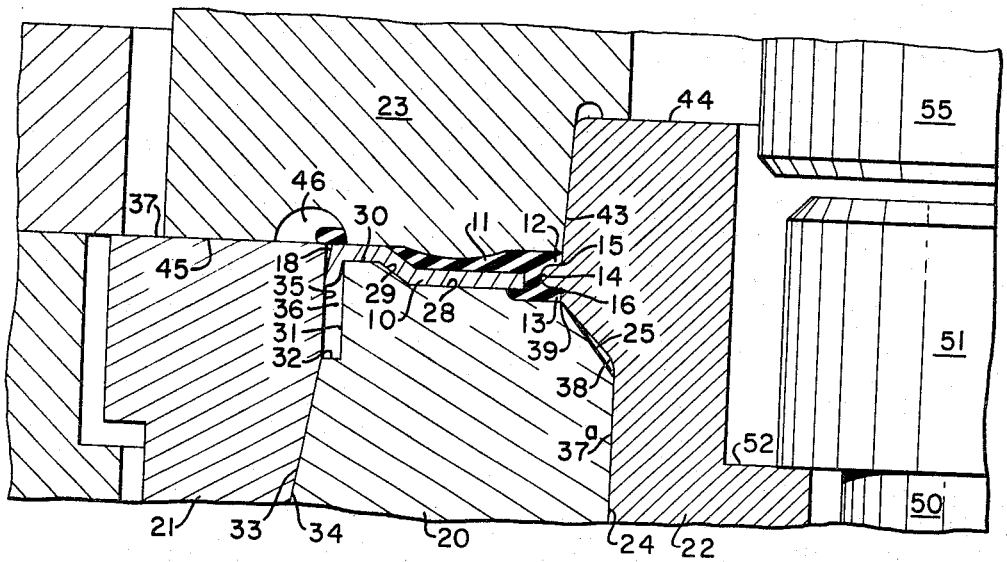
INVENTOR.
DOUGLAS J. ABERLE
BY *A. Donham Owen, and Robert E. Wickersham*
ATTORNEYS

United States Patent Office 3,341,647
Patented Sept. 12, 1967

3,341,647
METHOD AND APPARATUS FOR MAKING DUAL-LIP SEALS
Douglas J. Aberle, San Carlos, Calif., assignor to Federal-Mogul Corporation, a corporation of Michigan
Filed Oct. 14, 1963, Ser. No. 315,808
9 Claims. (Cl. 264—325)

This invention relates to method and apparatus for making continuous annular shaft-sealing elements of the dual-lip type.

The invention relates particularly to the manufacture of dual-lip lubricant seals. For example, it may be used to make seals for ball bearings and the like, such as the seal shown in the Patent No. 3,203,740, by Vasalie L. Peickii et al. That seal has a reinforcing metal member to which is bonded a unitary elastomeric member that provides a pair of axially spaced-apart annular sealing lips; before installation both lips extend in radial planes and are parallel. During installation, these lips are forced to diverge from each other by installing them over and on opposite sides of a ridge, which flexes the lips in opposite directions and away from each other, their natural tendency to resume their original shape acting to hold them in sealing contact with the ridge. Since the sealing edges are the inner edges of the lips, these edges must be sharp. This invention also applies to dual-lip seals such as those shown in U.S. Patent 3,010,748 of Robert N. Haynie.

A problem encountered in making such seals has been to obtain complete filling of both lip cavities while at the same time preventing the formation of mold flash at the sealing edges.

A related problem has been how to make the seals in a unitary molding, so as to hold down the expense of manufacture and obtain a reliable product.

These problems are solved by the present invention in which a unitary molding provides well-filled molded lips with sharp as-molded edges on their axially inner corners.

Other objects and advantages of the invention will appear from the following description of a preferred form thereof.

In the drawings:

FIG. 1 is a fragmentary view in elevation and in section of approximately half of a mold apparatus embodying the principles of invention. The mold is shown in its position near the beginning of the molding operation, when the mold is still mostly open as the upper mold element is being closed down toward the lower mold element, on which rests a reinforcing metal member and a blank annulus of uncured elastomeric material known as "prep."

FIG. 2 is a view similar to FIG. 1, showing the mold beginning to close while forcing the prep through a space between the reinforcing member and an annular forming projection on the mold core.

FIG. 3 is a similar view with the mold nearly but not quite closed and with some air still remaining on the outer edge of the cavity which forms the lower lip.

FIG. 4 is a similar view with the mold fully closed.

The finished product obtained from the mold shown in the drawings is, as shown in FIG. 4, a continuous annulus made up of a metal reinforcing member 10, which may have the configuration shown, and an elastomeric member 11 having two radial lips 12 and 13, both of which are substantially rectangular in cross-section and are separated by a radial recess having a semi-circular apex 14. The problem is to get both the lips 12 and 13 well filled in a single molding, so that the sealing edges 15 and 16, which are the axially inner edges of the lips 12 and 13, are sharp. This necessitates a good filling without entrapped air, and also requires that the edges 15 and 16 be free from the flash that ordinarily forms at the places where air escapes from the mold cavity.

To make the seal shown, the invention preferably employs a four-element mold having a lower middle ring 20, a lower radially outer ring 21, a lower radially inner ring or core 22, and an upper ring 23. By modifications which will be apparent to a man skilled in this art, the invention can be used in making other types of seals. The example will serve to illustrate the principles.

The lower middle ring 20 has a cylindrical radially inner surface 24 from which an outwardly and upwardly sloping surface 25 leads to a configurated upper surface preferably comprising, in succession, a lower-lip-bounding horizontal surface 26, an upwardly extending lip-close-off portion 27, a reinforcing-member-supporting lower horizontal surface 28, a reinforcing-member-supporting frusto-conical surface 29, and a higher-level, flat, reinforcing member supporting surface 30. Beyond the surface 30 is a cylindrical wall 31 that leads down to a horizontal shelf 32 that is followed by a downwardly and outwardly flared outer peripheral surface 33.

The lower outer ring 21 has an inner peripheral surface 34 which mates with the surface 33, a vertical cylindrical ground surface 35 spaced from and parallel to the cylindrical wall 31 by the portion 32, so as to leave a cylindrical recess or groove 36, and a flat upper surface 37. It will be seen that the shape of the reinforcing metal member 10 conforms to the shape of the surfaces 28, 29 and 30, and that the member 10 has an axial end flange 17 extending down into the groove-like recess 36.

The lower inner ring or core 22 has an outer cylindrical peripheral portion 37a snugly engaging the surface 24 and leading to an upwardly and outwardly flaring ground portion 38. A significant feature of this invention is that this portion 38 is so sloped that it meets the sloping surface 25, which it faces, only at the outermost circular line of contact 39 and that this circle 39 lies at the very outer edge of the lip 13 to be formed; the surfaces 25 and 38 diverge from each other in a downward and inward direction; moreover, they are ground but are not lapped so that there are microscopic air passages at the circle 39 thereby enabling the passage of air or gas from the lip cavity through the point 39, into the space formed by the divergence of the portions 25 and 38. The core 22 also has a short vertical cylindrical portion 40 defining the inner periphery of the lip 13, a hump or annular projection 41 defining the space between the lips 12 and 13, and a short vertical cylindrical portion 42 for the inner periphery of the upper lip 12. From there an upwardly and inwardly tapered frusto-conical portion 43 leads to a generally flat upper end 44.

The upper ring 23 is provided with a lower surface having a generally flat outer portion 45 that has a flash or excess-receiving cavity 46, which lies radially inside the cylindrical wall 31, so as to prevent excess elastomer from bonding to the outer periphery of the member 10 that is the surface 18 of the flange 17. The upper ring 23 also has a corner portion 47, and a lip-bounding portion 48 which is approximately coplanar with the portion 45. An upwardly and inwardly tapered surface 49 mates with the portion 43 and is blued in with it.

In addition to these four mold elements, the drawings show a center bolt 50 having a head 51 which engages a shelf 52 on the core 22 and which is secured to the middle ring 20 at a point not shown in the drawing. FIG. 3 shows that the core 22 is so proportioned that there is a clearance between its lower surface 53 and a central shelf 54; hence, the surface 53 does not seat on the shelf 54, and the only seating of the core 22 is at the circular line of contact 39. When assembling the mold, the operator tightens the bolt 50 transmitting the force from the core 22 to the ring 20 to align the mold, and loosens the bolt 50 slightly so that the mold can breathe through the microscopic pores at the circle 39, provided by the minor irregularities inherent in an unlapped ground surface. The two-piece construction of the core 22 and ring 20 is utilized in order to obtain this breathing or air exit at the circle 39 at the edge of the cavity for the lower lip 13, while barring there the passage of the elastomer being molded. Meanwhile, the outer ring 21 is used to hold the flange 17 of the reinforcing member 10 within a press fit on the surface 35, both for loading the member 10 and for unloading the finished seal from the lower cavity.

The upper ring 23 is preferably provided with a lost-motion connection to a central bolt member 55 through some Belleville springs 56.

When the mold is open, the preformed rigid case member 10 is loaded into it and a ring 60 of prep is placed over it. The prep ring 60 is usually simply a washer-like annulus of synthetic elastomer which is customarily rectangular in cross-section; it may be the result of cutting a tubular extrusion off at spaced intervals to provide approximately the quantity of elastomer that will fill the mold and provide a slight excess, the calculation being made closely to insure that there will be no deficiency of elastomer for the mold and to insure complete fill of the lip cavities. This ring 60 preferably rests on the hump 41 and against the surface 42, and it may sag slightly to lie on the inner case 10.

As the mold closes from the FIG. 1 position to the FIG. 2 position, it begins squeezing the prep ring 60, forcing a portion 61 to move radially outwardly and another portion 62 to move axially downwardly through a gap 63 lying between the hump 41 and the inner end 64 of the case 10. It will be seen that there is no difficulty in filling the upper lip cavity, since it is filled almost immediately and remains filled. Some air may be forced initially in between the surfaces 43 and 49, and soon the cavity for the lip 12 is exhausted. The elastomer is forced down by the close fit so that it gradually is expressed into other directions.

Between FIG. 2 and FIG. 3 the upper mold member 23 has moved closer toward the lower mold member 20, and the shape of the seal element has been generally formed. Thus, the upper lip 12 is approaching its final configuration, while the lower lip 13 has not quite been filled, there remaining in its cavity some air which was trapped in the mold by the elastomer which is meanwhile moving down and exerting a large hydraulic pressure. In FIG. 3, the cavity for the lip 13 has been filled except for the critical corner edges of the lip, the portion 65 of air still remains. However, this portion is now being forced toward the outer corner 39 from which the air can flow in a manner somewhat like a molecular sieve to get in between the core 22 and the mold member 20 via the microscopic scratch-like irregularities on the ground surfaces 25 and 38, through the circle-of-contact 39 and into the cavity where the surfaces 25 and 38 diverge, and thence be compressed and perhaps move out between the surfaces 37a and 24. At the same time, the excess rubber is being moved radially outwardly and its outer edge 61 has reached the excess collecting cavity 46, into which it flows instead of onto the outer surface 18 of the flange 17, thereby preventing the bonding of unwanted elastomer onto the surface 18.

In FIG. 4, the mold appears in its final closed position with the excess pinched off in the cavity 46. The lip 13 is completely filled giving a sharp inner edge, and the air has flowed into the space between the surfaces 25 and 38. When the air is expressed, the hydraulic pressure of the elastomer tends to close the core 22 even tighter against the ring 20, so that the viscous elastomer is unable to flow out through the microscopic passages that the air went through. Thus, upon completing the cure and opening the mold, the element 11 has been molded with its sharp edges 15 and 16 and with a good solid fill within the mold due to the method of expressing the air therefrom. Flash is absent, not only from the edges 15 and 16, but also from the edge in contact with the circle 39.

Other types of dual-lips are made similarly, so far as concern the circle 39, the ground surfaces 25 and 38, and the use of hydraulic pressure to force out air while restraining the passage of viscous elastomer. Other portions of the mold may be quite different in shape.

To those skilled in the art to which this invention relates, many additional changes in construction and widely differing embodiments of the invention will suggest themselves without departing from the spirit and scope of the invention as defined in the claims.

What is claimed is:

1. A mold for unitary molding of an elastomeric member, said mold insuring good filling of a mold cavity with sharp edges, comprising:

a plural-piece lower mold member having an inner portion and an outer portion that meet at a sharp line of contact providing the sole firm engagement between said inner and outer portions, said mold cavity lying entirely above said line and a gas-escape cavity lying below said line and formed by diverging opposing surfaces of said inner and outer portions, an upper mold member meeting said lower mold member above said line and cooperating with said lower mold member to define said mold cavity, and closure means for exerting hydraulic pressure through an elastomeric blank placed in said mold and for causing it to express gas into said gas-escape cavity while simultaneously forcing said inner and outer portions of said lower mold member together more tightly at said sharp line of contact so as to prevent passage of viscous elastomer past said sharp line of contact into said gas-escape cavity.

2. A compression mold for unitary molding of an annular elastomeric member, that insures good mold filling of a mold cavity with sharp edges, comprising:

a plural-piece lower mold member having an inner annular core and a ring around said core that meet at a sharp circle of contact providing the sole firm engagement between said core and said ring, the mold cavity lying entirely above said circle and a gas-escape cavity lying below said circle and formed by diverging facing surfaces of said core and ring, an upper annular mold member meeting said core above said circle and cooperating with said core and said ring to define said mold cavity, and means for forcing elastomer placed in said mold to flow upon closure of said mold and exert hydraulic pressure forcing gas past said sharp circle of contact into said gas-escape cavity, while simultaneously forcing said ring and core to tighten against each other at said sharp circle of contact and prevent passage of the elastomer itself therethrough.

3. A compression mold for unitary molding of an annular elastomeric member, for insuring good filling of a mold cavity with sharp edges, comprising:

a plural-piece lower mold half having an inner core, a ring around said core, said core meeting said ring and resting on it only at a sharp circle of contact providing the sole firm engagement between said core and said ring, with a mold cavity entirely above said circle and a gas escape cavity below said circle formed by diverging ground surfaces of said core and ring, and means securing said core to said ring for extremely limited relative movement therebetween, and an upper mold half meeting said core above said circle and cooperating with said lower mold half to define said mold cavity, whereby closure of said upper mold half toward said lower mold half causes an elastomeric blank to flow and exert hydraulic pressure to express air through said circle along the ground surfaces and then to further tighten said core against said ring to prevent passage of viscous elastomer through said circle.

4. A compression mold for unitary molding of an annular elastomeric member to a reinforcing metal member for insuring good filling of a mold cavity with sharp edges, comprising:

a plural-piece lower mold half having an inner core,
a ring around said core,
said core meeting said ring and resting on it only at a sharp circle of contact providing the sole firm engagement between said core and said ring,
with a mold cavity entirely above said circle and a gas escape cavity below said circle formed by diverging ground surfaces of said core and ring,
said reinforcing member resting on said ring and spaced away from said core,
and means securing said core to said ring for extremely limited relative movement therebetween, and
an upper mold half meeting said core above said circle and cooperating with said lower mold half to define said mold cavity,
whereby closure of said upper mold half toward said lower mold half causes an elastomeric blank to flow and exert hydraulic pressure to express air through said circle along the ground surfaces and then to further tighten said core against said ring to prevent passage of viscous elastomer through said circle.

5. A mold for unitary molding of a metal-reinforced elastomeric lubricant seal, comprising:

a plural-piece lower mold half having a center bolt,
an inner annular core around said bolt, and
an outer ring around said middle ring and providing a recess around said outer ring,
a middle ring around said core,
said bolt securing said middle ring to said core, said core resting on said middle ring at a sharp circle of contact providing the sole firm engagement between said core and said middle ring,
a mold cavity above said circle, and
a gas escape cavity below said circle and formed by diverging ground and unlapped frusto-conical surfaces of said core and said middle ring,
the metal reinforcement for said seal having a generally radially extending annular portion resting on said middle ring and an outer axially extending flange extending in said recess during molding,
an upper mold member meeting said core above said circle and cooperating with said lower mold half to define said mold cavity, said upper mold member having a cavity for excess elastomer lying just radially inwardly of said recess between said middle and outer rings, to prevent undesirable bonding of elastomer to said flange, the elastomer being caused to flow by closure of said mold to express air at said circle of contact and to exert hydraulic pressure that prevents passage of elastomer at said circle of contact.

6. A mold for unitary molding of a dual-lip annular sealing element having parallel lips with sharp axially inner edges, comprising:

a plural-piece lower mold member providing an inner core and a radially outer ring meeting at the outer edge of the lower of said two lips, said core providing the cylindrical edges of both said lips, parallel inner radial surfaces of said lips and sharp axially inner edges, said ring providing the axially outer face of the lower said lip, entirely above said outer edge,
an upper mold member meeting said core at the axially outer edge of the upper said lip and providing the axially outer face of said upper lip,
said upper mold member and said core mating along a taper while said lower mold member and said core member touch at said outer edge and diverge from each other inwardly and downwardly therefrom, and means for forcing an elastomeric blank from which said sealing element is to be formed in said mold to exert hydraulic pressure during closure of said mold to force gas toward and through said meeting of said core and ring while simultaneously tightening said ring against said core so as to bar passage therethrough of elastomer.

7. A method of molding elastomeric members in a plural-element mold having a mold cavity that provides sharp edges between two stationary parts of the mold, comprising:

closing said mold upon uncured elastomer so as to deform it and develop hydraulic pressure by the deformation,
employing said elastomer and its hydraulic pressure to drive the air in said cavity into a corner therein at one of said sharp edges,
driving the air out between the said stationary parts at said edge,
employing said elastomer to force at least one of said two stationary parts to move toward the other one and thereby tighten the gap between said stationary parts to seal said edge against passage of elastomer and fill said cavity, and
curing said elastomer in said mold.

8. A method of molding an elastomeric ring in a plural-element mold having an annular mold cavity that provides a circle of contact between two separate stationary parts of the mold, comprising:

closing said mold upon a ring of uncured elastomer so as to cause its flow deform with resultant hydraulic pressure,
employing said elastomer and its hydraulic pressure to confine the air in said cavity and move it in a single body toward said circle of contact under pressure,
driving the air out between the said stationary parts at said circle of contact,
employing said elastomer to act on said two stationary parts and cause them to tighten together at said circle to bar passage of elastomer therebetween and to fill said cavity, and
curing said elastomer in said mold.

9. A method for obtaining good mold fill and sharp edges on a molded elastomeric member in a plural-element mold having a mold cavity with sharp edges at a circle of contact between two separate stationary parts of the mold, comprising:

closing said mold to compress a ring of uncured elastomer and cause it to flow,
directing the flow of said elastomer to drive the air in said cavity toward and through said circle of contact,
moving together said stationary parts at said circle of contact by the hydraulic pressure of said elastomer to tighten the contact between said stationary parts and thereby to prevent passage of elastomer between said stationary parts and to fill said cavity, and
curing said elastomer in said mold.

References Cited

UNITED STATES PATENTS

| | | | |
|---|---|---|---|
| 2,982,999 | 5/1961 | Stewart | 18—59 |
| 3,063,097 | 11/1962 | Jutzi | 18—36 |
| 3,090,996 | 5/1963 | Reichenbach et al. | 18—36 |

ROBERT F. WHITE, *Primary Examiner.*

G. AUVILLE, *Assistant Examiner.*